Aug. 19, 1930.   L. A. KING   1,773,106
CAMERA
Filed Feb. 14, 1927   4 Sheets-Sheet 1
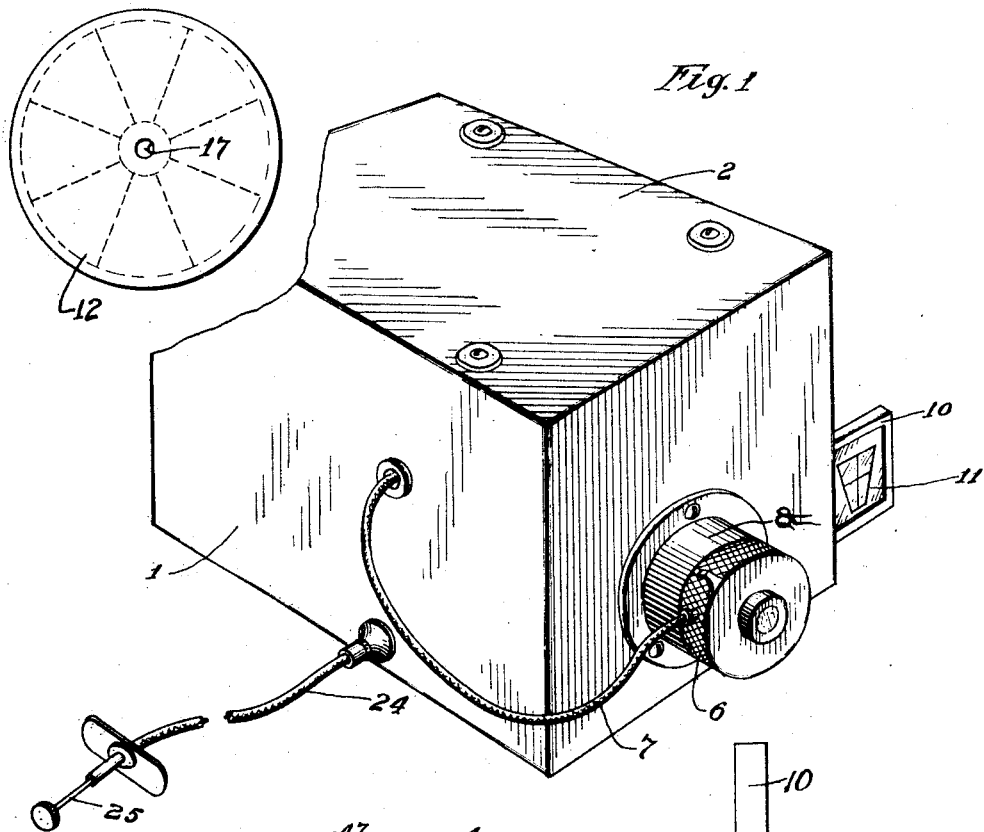
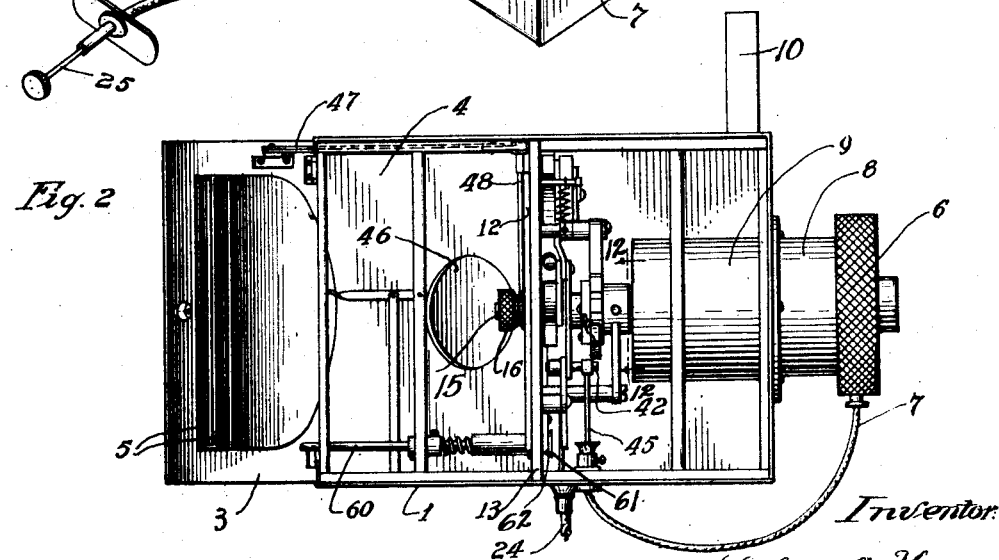
Inventor:
Leland A. King
By: Williams, Bradbury,
McCabe + Hinkle
Atty's

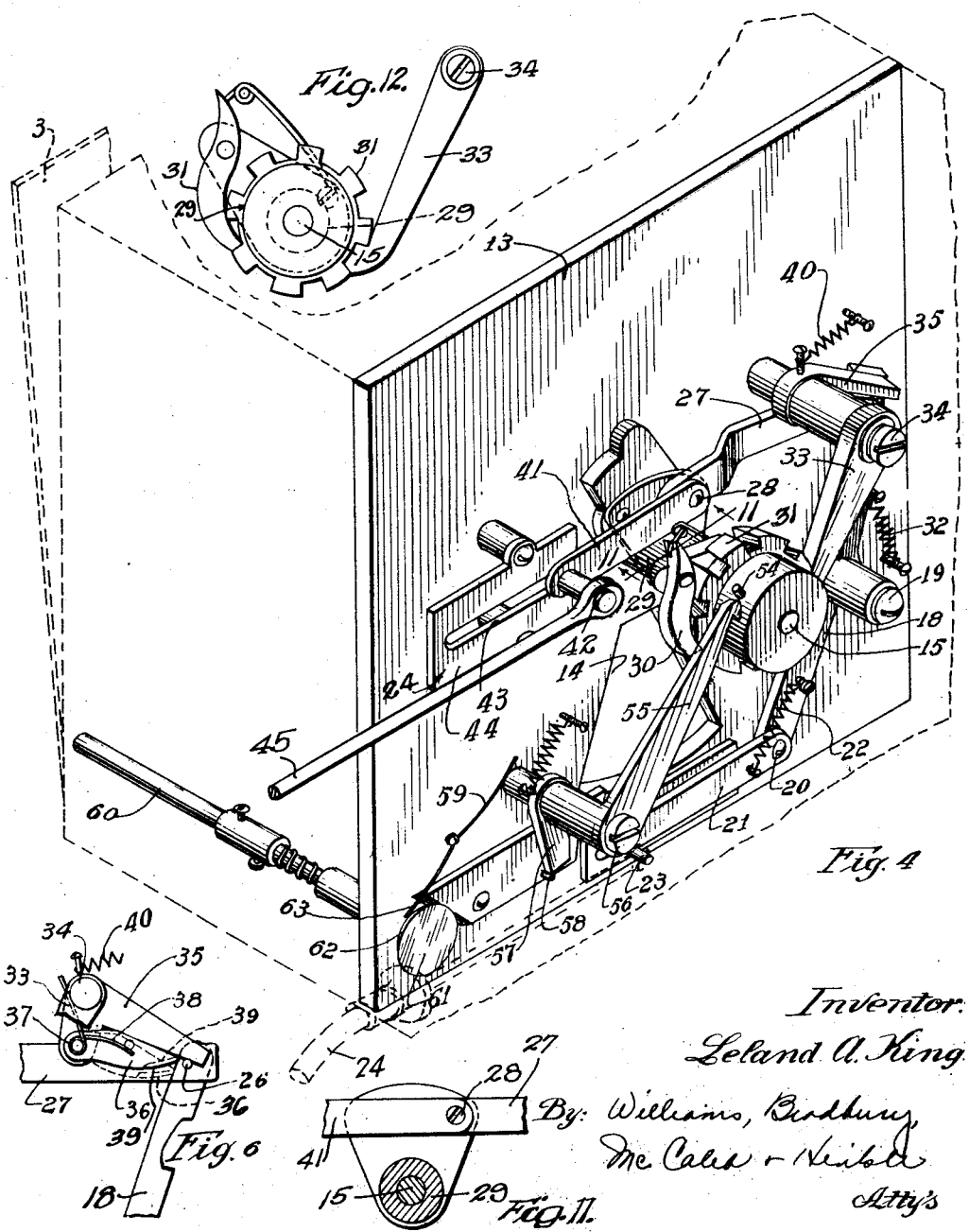

Aug. 19, 1930.   L. A. KING   1,773,106
CAMERA
Filed Feb. 14, 1927   4 Sheets-Sheet 3

Inventor:
Leland A. King
By: Williams, Bradbury,
McCaleb & Hinkle
Atty's

Aug. 19, 1930.  L. A. KING  1,773,106
CAMERA
Filed Feb. 14, 1927  4 Sheets-Sheet 4

Inventor:
Leland A. King
By Williams, Bradbury,
McCaleb & Hinkle
Attys

Patented Aug. 19, 1930

1,773,106

UNITED STATES PATENT OFFICE

LELAND A. KING, OF CHICAGO, ILLINOIS

CAMERA

Application filed February 14, 1927. Serial No. 167,958.

My invention relates to cameras, and more particularly to cameras for taking pictures on segmental portions of the photographic film progressively.

An object of my invention is to provide a camera of the character described for progressively moving segmental portions of the film into registration with the camera lens, and subsequently operating the camera shutter to expose the film.

A further object of the invention is to provide a camera of the character described, in which automatic means cooperates with the film advancing mechanism to prevent further exposure of the negative after each of the segmental portions have been exposed. In this manner I have guarded against double exposure should the operator neglect to count the successive exposures or should the control mechanism be inadvertently operated after complete exposure.

A further object of the invention is to provide a camera of the character described, having automatic means controlled by the opening and closing of the film compartment for re-establishing operative conditions of the shutter. Thus, after a film has been entirely exposed, the shutter mechanism cannot be again actuated without first opening and closing the film compartment as in the introduction of an unexposed film.

Other objects and advantages of my invention will appear more fully from the following description and the accompanying drawings in which similar characters of reference indicate similar parts throughout the several views.

Figure 1 is a perspective view of an embodiment of the invention;

Figure 2 is a top plan view of the camera with the top plate removed, and the photographic film compartment opened;

Figure 3 is an elevation of the photographic film employed;

Figure 4 is a perspective view of the photographic film advancing mechanism removed from the camera;

Figure 5 is an elevation of a part of the mechanism shown in Figure 4;

Figure 6 is a fragmentary view showing a part of the mechanism illustrated in Figure 4;

Figure 11 is a fragmentary section taken on the plane of lines 11—11 in Figure 4, showing the link 27 and associated parts;

Figure 7:
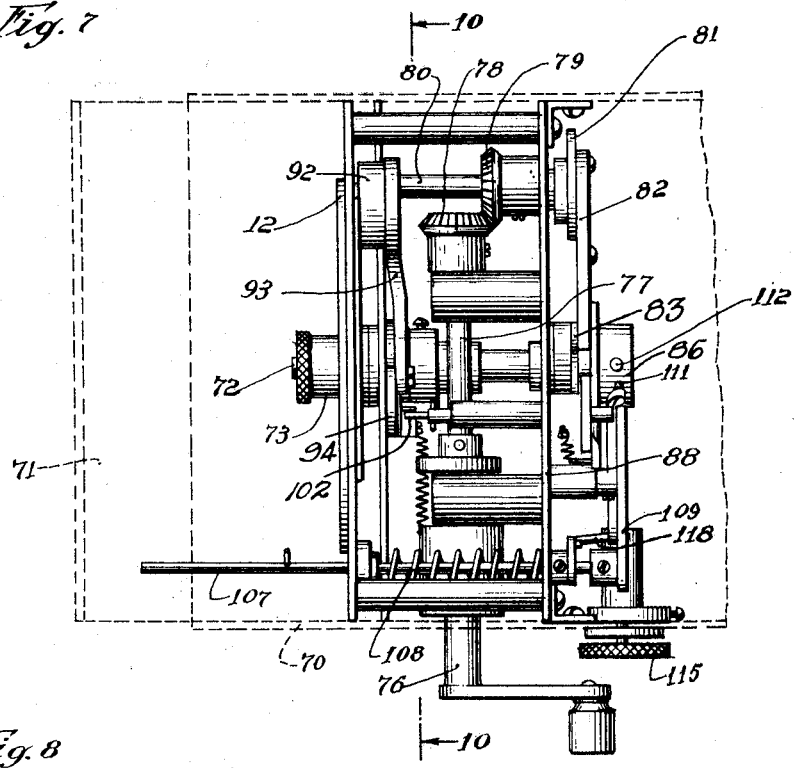
Figure 7 is a top plan of a modified form of the invention.
Figure 8:
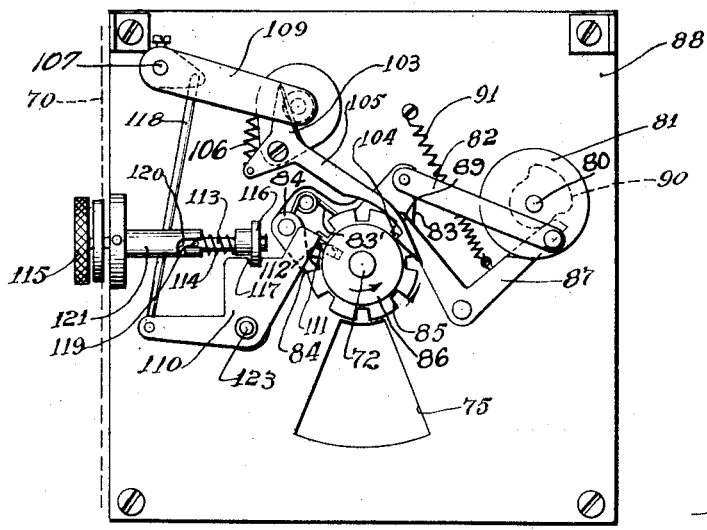
Figure 8 is a front elevation of the mechanism illustrated in Figure 7.

Figure 12 is a fragmentary detail sectional view taken on the line 12—12 of Figure 2, looking in the direction of the arrows and showing the pawl 30 and dog 33 and associated parts.

In carrying out the invention, I make use of a case 1 having a removable top cover plate 2 and a hinged rear door 3 which when opened provides access to the film compartment 4 of the camera (see Fig. 2). A pair of pockets 5 secured to the inner wall of the door 3 provide storage space for two negatives.

The camera 1 is provided with the standard type of shutter 6 actuated by the cable release 7. The shutter assembly is carried by a tube 8 which is slidable within a fixed casing 9 projected through the front walls of the camera. This is for the purpose of focusing the camera. To further aid in the framing of the subject, I provide the ordinary type of direct view finder 10 having a mask 11.

With reference to Figure 4, I have shown the mechanism for carrying and advancing the circular film employed. Such a film is shown at 12 in Figure 3. The mechanism is mounted upon a removable partition wall 13, disposed transversely across the interior of the camera 1. The wall 13 has an opening 14 therethrough having the contour of a one-eighth sector of the circular photographic film 12.

The mechanism consists in a shaft 15 which projects through the wall 13 into the film compartment 4, and is threaded at that end and provided with a nut 16 by means of which the film 12 is secured to the shaft with its emulsion toward the wall 13. The film is provided with an opening 17 through which the shaft is passed.

Mechanism for rotating the shaft one-eighth of a turn is provided in a lever 18 pivotally mounted at its mid-point upon a screw 19. The lower end of the lever 18 is pivotally connected at 20 to a reciprocal arm 21. A tension spring 22 having its ends mounted on adjacent portions of the lever 18 and arm 21 serves to exert an upward tension upon the pivotally mounted and reciprocable arm 21. The outer end of the arm 21 has a pin 23 extending laterally therefrom, which engages at one end with a cable release 24. The opposite end of the release carries a standard type of push rod 25 for actuation of the cable so as to propel the arm 21 toward the lever 18 and thus move the lever upon its pivotal mounting.

The upper end of the lever 18 is connected by a pin 26 to a link 27, (see Fig. 6). The pin 26 extends outwardly from the face of the link for a purpose hereinafter described. The opposite end of the link 27 is connected at 28 to a drum 29, rotatably mounted upon the shaft 15. A spring pressed pawl 30 is carried by the drum for engagement with a ratchet wheel 31 fixed to the shaft 15. There are eight teeth on the ratchet wheel 31, and the mechanism consisting of the arm 21, lever 18, link 27, and drum 29 is so arranged as to cause a one-eighth rotary movement of the drum each time the arm 21 is actuated by the cable release 24. The rotation of the drum 29 is caused by movement of the link 27 which is connected at 28 to the drum so that upon each reciprocal movement of the link the drum 29 carrying the pawl 30 moves a distance sufficient to advance ratchet wheel 31 by engagement therewith which is in turn fixed to the shaft 15. Thus the shaft 15 is advanced with each stroke of the cable release 24, a distance sufficient to bring an unexposed part of the film into registration with the aperture 14. A tension spring 32 serves to maintain the lever 18 in the position shown in Figure 4 and thus hold the arm 21 in operative position for actuation by the cable release.

Means for positively locking the shaft 15 against movement during the retraction of pawl 30 is provided in a dog 33 pivotally mounted on a shaft 34 having a radially extending arm 35 which bears upon the pin 26. The arm 35 (see Fig. 6) carries a shoe 36 which is pivotally mounted at 37 thereto, and normally held in engagement with the arm by a spring 38. When the pin 26 moves to the left (see Fig. 6) as by actuation of the arm 21, it engages with a laterally and inwardly extending portion 39 of the shoe to elevate the arm 35 and cause the dog 33 to move out of engagement with the teeth of the ratchet wheel 31. Upon the return movement of the pin 26 with its associate link and lever the pin travels behind the portion 36 and the shoe slips under the pin against the force of the spring 38. At this time the dog 33 is maintained by a spring 40 in engagement with the teeth of the ratchet wheel 31 to prevent rotation of the shaft 15 during the exposure of the film which takes place at this time.

Means for operating the shutter 6 of the camera at the end of the advancing rotary movement of the shaft 15 is provided by a plate 41 which is pivotally connected at 28 to the link 27. At the outer end of the plate 41 is a pin 42 extending laterally therefrom, the rear portion of which slides in a slot 43 of a plate 44.

Referring now to Fig. 2, it will be seen that the cable 45 of the cable release 7 for operating the shutter is connected with the pin 42 so that movement of the plate 41 at the end of its stroke and after the drum 29 has ceased rotating will cause the shutter 6 to operate and expose that portion of the film in registration with the opening 14.

Means for causing the film to bear closely against the rear face of the wall 13 to assure positioning of the film in the focal plane of the camera is supplied by a disc 46, which is hingedly secured to the bottom wall of the camera. A push rod 47 which is moved toward the front of the camera as the rear door 3 is closed actuates the shaft 48 for moving the disc 46 into registration and to bear against the film at that portion in the region of the opening 14. This mechanism is shown in Figure 2. The disc 46 is fixed and extends radially from the shaft 48. The push rod 47 is connected to an arm extending from the push rod 48 shown in dotted lines so that upon each inward movement of the push rod the shaft 48 is rotated to swing the disc 46 against the negative. When the door is opened the disc falls back to readily permit extraction of the film.

One of the important features of my invention is an automatic means for preventing further operation of the shutter 6 after all of the segmental portions of the negative have been exposed. In other words, when the shaft 15 has been advanced 360°. This mechanism consists (with reference to Fig. 5), in a slotted plate 50 in which the inner end of the pin 23 rides upon reciprocal movement of the arm 21. A portion 51 of the plate 50 is cut away, communicating with the remote end of the slot. A pivotally mounted key 52 is provided, one end 53 of which is formed to entirely close the cut-away portion 51 of the plate 50 so that the pin 23 is free to move in the slot as long as the key 52 lies in the position shown in Figure 5. If, however, the key moves to the position shown in dotted lines upon its pivotal support the pin 23 will move up into the cut-away portion 51 by virtue of the upward force exerted by the spring 22, and further movement of the arm in its reciprocal path is prevented. Also, the pin 23 is thus elevated and is out of registration with the inner end of the cable release 24, so that pressure of the cable release will not actuate any part of the mechanism heretofore described.

Means for automatically elevating the key 52 once during a complete revolution of the shaft 15 is provided in a pin 54 extending radially from the hub of the ratchet wheel 31 which engages with a dog 55 pivotally mounted at 56 to the wall 13. A radial locking arm 57 associated with the dog 55 normally bears against a pin 58 carried by the key 52, so as to maintain the key in the position shown in the full lines of Figure 5. When the dog 55 is elevated by engagement of the pin 54 therewith, the arm 57 will move out of registration with the pin 58 and a spring 59 provided for the key will elevate the key and thus prevent further actuation of the advance and shutter mechanism.

Means for restoring the key 52 to its operative position shown in full lines of Fig. 5 consists of a spring pressed plunger 60 having a disc 61 with inclined edges 62 at its outer end. The edges 62 engage with the inclined surface 63 at the adjacent end of the key so that as long as the push rod 60 is extended toward the front of the camera as by closing the door 3 of the camera, the key will function to disconnect the mechanism upon the completion of the successive movement of the shaft 15 360°. To re-establish operative connection between the cable release 24 and the mechanism, it is only necessary to open and close the door 3 which is the natural operation employed for the substitution of an unexposed film for a fresh one. This is because the arm 57 is again engaged with the pin 58, the pin 54 having passed from engagement with the locking dog 55. Hence as the door is opened the disc 62 by engagement with the member 52 will move the member to full line position (see Fig. 5) so that the locking arm 57 will overlie pin 58.

The usual method employed for the introduction and removal of films from the camera consists in the use of the light proof sleeve which is slipped over the camera and through which the hand of the operator is extended. I have found this to be an efficient daylight method of changing films.

In operation my improved camera is first loaded by opening the door 3 and placing a film in the manner described upon the rearward threaded portion of the shaft 15 and in turning the nut 16 securely in place. The door 3 is enclosed causing the push rod 60 to move the disc 61 out of registration with the key 52.

The key at this time is in registration with the cut away portion 51 and is held in that position by the presence of the pin 58, which bears against the arm 57. The pin 54 is just in advance of the end of the dog 55, which is a slight distance counter-clockwise from the position shown in Fig. 4.

The camera is then focused in precisely the same manner as the ordinary camera, and the cable release 24 is actuated by pressure upon the stem 25. This causes movement of the arm 21 and simultaneous movements each as described of the lever 18, the link 27 and the plate 41, as well as the drum 29 and the pawl 30, all cooperating to advance the shaft 15 a distance equal to one segmental portion of the disc which in the present embodiment (with reference to Fig. 3) will show one-eighth of a revolution.

At the end of the advance stroke of the plate 41 the cable release 7 actuates to open the shutter 6 and expose the then motionless film. When pressure is relieved from the stem 25 the mechanism resumes the position shown in Fig. 4, chiefly by virtue of the spring 32.

This operation is repeated with each change of posture, expression, or characteristic of the subject, until all eight sectors of the negative have been exposed. When the eighth sector has been exposed, the arm 21 will be elevated out of registration with the cable release 24 because of actuation of the key 52 in the manner described. It then becomes necessary to open the door 3 before the mechanism can again be operated. At this time an unexposed film is substituted for the exposed film in the camera.

In Figs. 7 to 10, inclusive, I have shown another modification of my invention, by means of which I may obtain the exposure of the several sectors of the film in more rapid succession and with consistency as to the time between exposures. This camera is especially well adapted for use in photographing a moving subject, and for that purpose employs a wide angle lens and a focal-plane shutter.

In this form of the invention the camera occupies a casing 70 similar in construction to the casing used in the first form described. This casing is provided with a door 71 at the rear for the introduction of photographic film to a film bearing spindle or shaft 72, upon which a nut 73 is carried for securing the film in place.

Means for advancing the film so that successive sectors thereof move into registration with the apparatus frame 74 and 75 is provided in a hand crank 76 keyed to a shaft 77, the inner end of which bears a bevel gear 78. The gear 78 meshes with a similar gear 79 carried by transversely disposed shaft 80. The shaft 80 has an eccentric plate 81 at the forward end thereof, which is connected by means of a pitman 82 (see Fig. 8 and Fig. 9) to a collar 83 rotatably mounted adjacent to the forward end of the shaft 72. The collar 83 carries a spring pressed pawl 84 which is arranged to engage with the toothed portion of a ratchet wheel 85 secured by means of its hub 86 to the shaft 72. The pawl 84 is so constructed as to operate upon the ratchet wheel 85 only in a counter clockwise direction and as the collar 83 is reciprocated the edge 84' of the pawl 84 rides over the teeth without binding. The spring 83', mounted upon the collar 83, yieldingly presses the pawl 84 against the ratchet wheel 85. Continuous rotary movement of the crank 76 will will, therefore, cause an intermittent rotary movement of the shaft 72. The number of teeth in the ratchet wheel 85 are determinable by the arc through which the film is to move for each exposure, and in the present case is 45 degrees.

Means for holding the shaft 72 against movement during the retraction of the pawl 84 is afforded by a bell crank 87 pivotally secured to the front plate 88 of the advancing mechanism, and which has a toothed portion 89 for engagement with the ratchet wheel 85. The opposite end of the bell crank 87 engages with a cam surface 90 of a portion extending laterally from the inner face of the eccentric plate 81. A spring 91 yieldingly maintains the bell crank in engagement with the cam.

Means for exposing the film 12 immediately subsequent to the advancement of the portion of the film into registration with the apertures 74 and 75 is provided in an eccentric plate 92 carried at the inner end of the shaft 80. The plate 92 is connected by a pitman 93 (see Fig. 10) to a flanged portion of a collar 94, which is rotatably mounted upon the adjacent rivet of the shaft 72. The collar 94 carries a pivotally mounted trip lever 95 thereon which has at its inner end a toothed portion 96 for engagement with a recess 97 in a drum 98 which is also rotatably mounted upon the shaft 72. The drum 98 has secured at its innermost end a shutter plate 99 provided with an opening 100 therethrough. The construction of the shutter plate 99 is similar to the construction of the ordinary type of focal-plane shutter of the rotary type, and is normally held in the position shown in Fig. 10 against the tension of a spring 101.

When the trip lever 95 is moved as by engagement with a spindle 102 projected into the path of the trip, the shutter is free to move by virtue of the spring across the apertures 74 and 75, so that the slot 100 traverses the apertures to expose the film.

Means for guarding against double exposure or to render the shutter mechanism inoperative upon the completion of a 360° rotary movement of the shaft 72 is provided in a pivotally mounted latch 103, which normally engages with the outer end of the spindle 102. In the path of the trip 95 a pin 104 carried by the hub 86 of the ratchet wheel 85 engages with a depending portion 105 of the latch 103 so as to move the latch out of engagement with the spindle and thus permit the spindle to move forwardly out of the path of the trip lever by virtue of a compression spring 106 associated with the spindle (see Fig. 9). In this manner operation of the shutter 99 is prevented upon the completion of a 360° rotary movement of the shaft 72.

Means for reestablishing the operative position of the spindle 102 when an unexposed film has been substituted for the exposed film is provided in a rearwardly extending spring pressed rod 107 which advances forwardly against the force of its spring 108. The outer end of the rod 107 carries a radially extending finger 109 which may be swung into registration with the adjacent end of the spindle 102 (see Fig. 8) so that a rearward movement of the rod, as by opening the rear door 71, will cause the finger to bear upon the spindle and move it rearwardly so that the latch 103 may again engage with the spindle to throw the spindle into the path of the trip lever 95.

Means for causing the finger 109 to swing toward and over the spindle 102 is provided in a pivotally mounted plate 110 carried by the front plate 88 of the advancing mechanism. This plate 110 has a pin 111 which bears against the hub 86 of the ratchet wheel 85 and which is received in a bore 112 in the hub immediately after the pin 104 has tripped the latch 103, as at that time the bore is in registration with the pin 111.

Means for causing the pin to bear against the hub and to fall into the bore is provided in a rod 113 with a spring 114 urging the rod toward the plate 110, and which has at its outermost end a thumb grip 115 disposed exteriorly of the camera case 70. The inner end of the rod 113 carries a disc 116 which engages with a notched portion 117 of the plate 110.

A connecting rod 118 connects the plate 110 with the rod 107, upon which the finger 109 is disposed, so that movement of the plate, as by projection of the pin within the bore 112, will cause the finger to move into registration with the spindle as described by virtue of the force of the spring 114.

Means for locking the rod 113 in such position as to hold finger 109 out of registration with the spindle 102 is provided in a locking pin 119 which engages with a bayonet slot 120 provided in the sheath 121 through which the rod 113 is projected.

Figure 9:
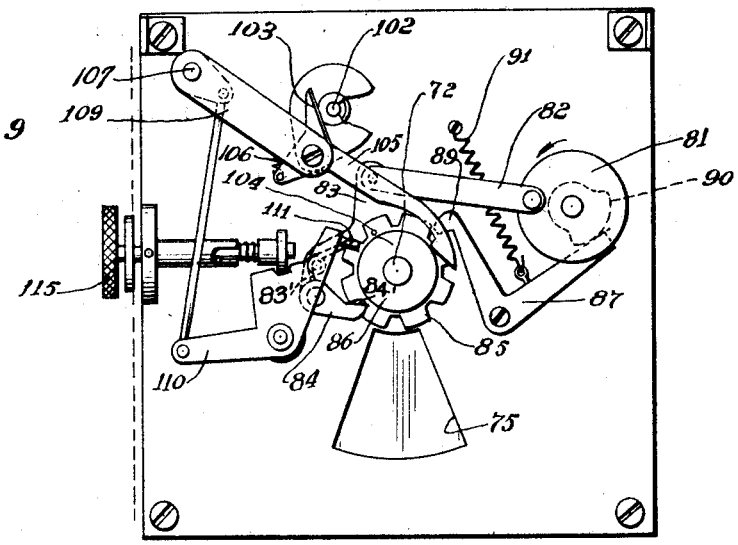
Figure 9 is a view similar to Figure 8 but with the elements in a different operative position.
Figure 10:
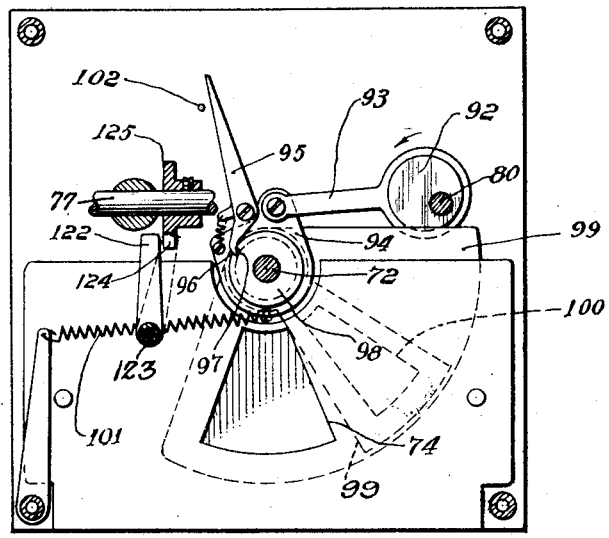
Figure 10 is a sectional view along the line 10—10 of Figure 7.

Means for locking the shaft 77 against movement after the finger 109 has been moved to overlie the spindle 102 is provided in a locking dog 122 carried by the shaft 123 upon which the plate 110 is disposed and which moves to the position shown in dotted lines (see Fig. 10), when the plate 110 is drawn to the position shown in Fig. 9, as by an outward movement of the shaft 113.

In operating this form of my camera, the door 71 is opened and the film 12 placed upon the shaft 72 and secured by the nut 73. As the door 71 opens, the rod 107 moves so as to reengage the spindle 102 with the latch 103 in the manner described. The rod 113 by means of the grip 115 is then drawn out so as to disengage the pin 111 from the bore in the hub 86 and the dog 122 with a notched portion 124 of a disc 125 carried by the shaft 77. The crank 76 may then be rotated to cause the film to advance 45 degrees by the mechanism described, and at the end of that movement the trip lever 95 will engage with the spindle 102 so as to release the shutter and the spring 101 will cause the shutter to move so that its aperture portion will traverse the apertures 74 and 75, and thus expose the negative. Continued movement of the crank 76 will advance another sector of the film and further exposure thereof in the manner described until eight intermittent movements and subsequent exposures have been brought about. At that time the pin 104 will engage with the depending portion 105 of the latch 103 to release the spindle so that the spring 106 will move the spindle out of the path of the trip lever. In order to reengage the shutter mechanism, it would then be necessary to open the back, as in the process of substituting an unexposed film for the exposed one.

If the pin 119 is out of engagement with the bayonet catch 120, the spring 106 prior to opening the back of the camera will cause the finger 109 in the manner described to overlie the spindle 102 and the dog 122 will engage with the notched portion 124 of the disc 125. When the door is then opened, the finger will reset the spindle and the photographer must then draw the rod 113 outwardly so as to disengage the pin 111 from the bore 112 before the camera may again be used.

I claim:

1. A camera for successively exposing segmental portions of a photographic negative comprising movable means for a supporting the film, and a lens shutter mechanism for exposing the film, means for advancing a segmental portion of the film into registration with the lens and shutter and for operating the shutter mechanism, said means including interlocking members for communicating movement to the movable supporting means, means associated with a movable member and with the interlocking members for disengaging the interlocking members when the movable member has completed a cycle of its movement, and other means associated with the film compartment door of the camera for re-engaging the interlocking members when the door is opened.

2. A camera for successively exposing segmental portions of a photographic film comprising a rotatable shaft, means for securing the film against movement on the shaft, a lens, a shutter, means for masking all but a segmental portion of the film which is in registration with said lens and shutter, manually controlled means including interlocking members for advancing said shaft through an arc determinable by the degree of said segmental portions of the film, and for operating said shutter, automatic means associated with said last named means for disengaging the interlocking members upon registration of the last segmental portion of the film with the lens, and other means associated with the film compartment door of the camera for re-engaging the interlocking members to re-establish the operativeness of said manually operated means.

3. A camera for successively exposing segmental portions of a photographic film, comprising movable means for supporting a photographic film, a lens, a shutter, a shutter cable release for said shutter, manually operable means for advancing said movable means for causing the segmental portion of said photographic film to move into registration with the lens and shutter, and means associated with the last named means for operating the shutter cable release when the segmental portion of the photographic film is in registration with the lens and shutter.

4. A camera for exposing segmental portions of a photographic film, said camera having a photographic film compartment and a door therefor, a shaft for supporting said photographic film, a lens for said camera, a photographic film engaging member, and means associated with said member and with the door of said film compartment for moving the member against the film and behind that part of the film in registration with the lens upon the closing of the door and being so constructed as to disengage the photographic film when the door is opened.

In witness whereof, I hereunto subscribe my name this 10th day of February, 1927.

LELAND A. KING.

CERTIFICATE OF CORRECTION.

Patent No. 1,773,106. Granted August 19, 1930, to

LELAND A. KING.

It is hereby certified that error appears in the printed specification of the above numbered patent requiring correction as follows: Page 2, line 110, and page 5, line 51, claim 1, for the word "negative" read film; and that the said Letters Patent should be read with these corrections therein that the same may conform to the record of the case in the Patent Office.

Signed and sealed this 21st day of October, A. D. 1930.

(Seal)

M. J. Moore,
Acting Commissioner of Patents.